US010436360B2

(12) United States Patent
Eilert et al.

(10) Patent No.: US 10,436,360 B2
(45) Date of Patent: Oct. 8, 2019

(54) ARTICULATED ASSEMBLY FOR PIPELINES

(71) Applicant: Mann+Hummel GMBH, Ludwigsburg (DE)

(72) Inventors: Lorenz Eilert, Braunschweig (DE); Guido Regener, Klein Denkte (DE); Stefan Sinkemat, Bad Harzburg (DE); Joerg Homann, Braunschweig (DE); Udo Fischer, Braunschweig (DE); Robert Lachut, Vienenburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 191 days.

(21) Appl. No.: 14/997,841

(22) Filed: Jan. 18, 2016

(65) Prior Publication Data
US 2016/0208966 A1 Jul. 21, 2016

(30) Foreign Application Priority Data
Jan. 19, 2015 (DE) .................. 10 2015 000 341

(51) Int. Cl.
*F16L 21/08* (2006.01)
*F16L 37/52* (2006.01)
*F16L 51/00* (2006.01)
*F02B 33/44* (2006.01)
*F02M 35/10* (2006.01)

(52) U.S. Cl.
CPC .............. *F16L 21/08* (2013.01); *F02B 33/44* (2013.01); *F02M 35/10144* (2013.01); *F16L 37/52* (2013.01); *F16L 51/00* (2013.01)

(58) Field of Classification Search
CPC .................................. F16L 21/08; F16L 37/52
USPC ....... 285/330, 261–262, 270, 305, 307, 314, 285/322–324, 339
See application file for complete search history.

(56) References Cited

U.S. PATENT DOCUMENTS

| 6,062,611 | A | 5/2000 | Percebois et al. |
| 6,749,454 | B2 * | 6/2004 | Schmidt ............ H01R 13/6277 439/350 |
| 6,846,022 | B2 | 1/2005 | Takagi |
| 7,806,445 | B2 | 10/2010 | Mutschlechner et al. |
| 2003/0162431 | A1 | 8/2003 | Schmidt |
| 2005/0264007 | A1 | 12/2005 | Porter |

(Continued)

FOREIGN PATENT DOCUMENTS

| DE | 1910988 A1 | 9/1969 |
| DE | 2755804 A1 | 6/1978 |
| DE | 4019408 A1 | 12/1991 |

(Continued)

*Primary Examiner* — Anna M Momper
*Assistant Examiner* — Fannie C Kee
(74) *Attorney, Agent, or Firm* — James Hasselbeck

(57) ABSTRACT

An articulated assembly for pipelines, including: two articulated sections; wherein one of the two articulated sections engages into another one of the two articulated sections; and a locking body that engages at least in areas between the articulated sections and cooperates with a locking contour on one of the articulated sections and with a locking section of the other articulated section such that a relative movement between the articulated sections is limited; wherein a guide means is provided on the articulated sections such that the two articulated sections can be joined together in a defined rotational position in relation to one another.

14 Claims, 6 Drawing Sheets

(56) References Cited

U.S. PATENT DOCUMENTS

2011/0225789 A1    9/2011  Darnell

FOREIGN PATENT DOCUMENTS

| | | |
|---|---|---|
| DE | 102007046203 A1 | 5/2008 |
| EP | 1092908 B1 | 3/2004 |
| EP | 1488155 B1 | 8/2005 |
| EP | 1657372 A2 | 5/2006 |
| EP | 2286132 A1 | 2/2011 |
| FR | 1469580 A | 2/1967 |

\* cited by examiner

ARTICULATED ASSEMBLY FOR PIPELINES

TECHNICAL FIELD

The invention relates to an articulated assembly for pipelines, particularly for establishing a semi-fixed pipe joint.

BACKGROUND OF THE INVENTION

An articulated assembly for pipes is known from EP2286132 A1 in which a pipe sleeve connects a male and a female pipe part. The pipe sleeve cooperates with an inner contour of the female pipe part in order to couple a pipe that can be received in the pipe receptacle in an articulated manner to the female pipe part. For this purpose, the pipe receptacle has a pipe stop formed from sections that project from an inner wall of the pipe sleeve.

SUMMARY OF THE INVENTION

It is an object of the invention to provide an easily and reliably mountable articulated assembly that is particularly suitable for semi-fixed pipe joints.

The abovementioned object is achieved according to one aspect of the invention by an articulated assembly with two articulated sections and a locking body, one of the two articulated sections engaging in the other and the locking body engaging at least in areas between the articulated sections and cooperating with a locking contour on one of the articulated sections and with a locking section of the other articulated section, and a guide means being provided on the articulated sections such that the two articulated sections can be joined together in a defined rotational position in relation to one another.

Favorable embodiments and advantages of the invention follow from the description and the drawings.

What is proposed is an articulated assembly including two articulated sections, wherein one of the two articulated sections engages in the other of the two articulated sections, and a locking body that engages at least in areas between the articulated sections and cooperates with a locking contour on one of the articulated sections and with a locking section of the other articulated section such that a relative movement between the articulated sections can at least be limited and wherein a guide means is provided on the articulated sections such that the two articulated sections can be joined together in a defined rotational position in relation to one another. Alternatively or in addition, an articulated assembly is proposed in which the locking contour of one articulated section comprises a plurality of recesses on its inner wall that correspond with locking elements of the locking body.

The articulated section that engages in the other articulated section is also referred to as the male articulated section, while the other articulated section is referred to as the female articulated section.

Unlike the prior art, no separate sleeve or coupling nut is provided for the fixation of a connection between the articulated sections, since a spherical section on the male articulated section is formed directly from the component of the articulated section and is provided for the fixation of the connection between the articulated sections. As a result, no end stop is required for the respective articulated section, either. The use of labor-intensive and expensive rubber elements to compensate for movements during assembly or resulting from changes in temperature during operation can thus be avoided.

The articulated assembly according to the invention is especially suited to the manufacture of a fixed or semi-fixed connection, such as in charge air lines in motor vehicles or connections with dynamic movement stresses, particularly with high temperature and pressure loads on the connection. The articulated assembly can easily compensate for movements during installation or resulting from slight positional changes between connection points. Both changes in length of a few millimeters and angle errors of a few degrees between the articulated sections can be compensated for without introducing tension into the articulated assembly on one side.

In particular, when two articulated sections are provided in a pipeline, for instance, movements between connection elements in fixed connections can be compensated for with only slight deviations. Relative movements of the articulated sections in relation to one another that are necessary during assembly in order to compensate for tolerances can be executed, whereas the connection can be fixed and not detachable in a destruction-free manner in the assembled state, enabling, at most, small movements of the articulated sections brought about by changes in the thermal geometry.

According to one favorable embodiment, the locking body can have on its outer periphery a flattened region or recess corresponding to the guide means of the articulated sections. Advantageously, the locking body can be embodied as a ring, particularly as a tapered ring. Due to the flattened region or recess on the periphery, the locking body is able to slide past the guide means and simultaneously be oriented so as to fit with it. The two articulated sections and the locking body can thus be positioned in a defined manner with respect to one another. By virtue of this embodiment of the locking body, a low level of rotatability of the articulated sections can be enabled which can preferably lie between 1° and 5°, especially preferably between 2° and 3°. For this purpose, the guide means can expediently be adapted accordingly.

If a provision is alternatively or additionally made in the articulated assembly that the locking contour of one articulated section comprises a plurality of recesses on its inner wall that correspond with locking elements of the locking body, the locking elements can lock with the recesses. Advantageously, the recesses can be embodied at the same axial height of the articulated section. Alternatively, it is conceivable for the locking contour to be formed by a circumferential groove. It is especially advantageous in an embodiment with a plurality of recesses on the inner wall for the strength of such an articulation part to be greater than that of an articulated section with a circumferential groove. The greater the number of recesses and the lockable locking elements associated therewith, the more homogeneous the transmission of force into the articulated section. If the number is lower, the locking body can be bent more easily with its locking elements in order to lock with the locking contour.

According to one favorable embodiment, one of the two articulated sections can have a fork with prongs projecting in the axial direction between which a radial projecting pin of the other of the two articulated sections can be guided, with fork and pin being part of the guide means. Such a construction is easy to manufacture and provides a reliable guide. Furthermore, after the connection of the articulated sections has been established, it can readily be recognized from the outside on the basis of the pin whether the articulated sections and the locking body are correctly positioned and properly joined together, even though the male articulated section and the locking body dip practically completely into the female articulated section after closure.

Advantageously, the locking section of the locking body and the locking section of the articulated section, e.g., of the male articulated section, can form a positive fit on contact. In this way, the male articulated section can effectively be prevented from inadvertently sliding out of the female articulated section of the articulated assembly.

It is especially advantageous if the locking body is embodied as a tapered ring. The locking body can have a bearing surface for a front side, for example, of the female articulated section and have a collar that engages between the two articulated sections and the locking elements. In this way, the locking body can be mounted in a simple and space-saving manner. Advantageously, the locking contour can be arranged on an inner side of the tapered ring and the hooks for cooperating with the locking contour on an outer side of the tapered ring. For example, the locking elements can be embodied as locking hooks on whose surfaces arranged radially on the inside the locking contour is embodied, e.g., in the form of a surface region formed complementarily to the locking contour of the, for example, male articulated section. However, an inverted embodiment with hooks on the inner side of the collar of the locking body and a locking contour on the outer side, each of which cooperates with corresponding counterparts of the articulated sections, is also conceivable.

Advantageously, the male articulated part can have a sealing groove on its outer surface. In this way, a pressure-tight connection can be ensured.

Expediently, the diameter of the locking body can be reversible expandable for proper mounting. For example, a slot can be provided in the locking body. As a result, the locking body can easily be expanded during assembly in order to push it onto the corresponding articulation part. The locking section of the other articulated section engaging in the articulated section can have a spherical shape for the fixation of the two articulated sections. Advantageously, this articulated section can have on its outer surface a sealing groove at the apex of the spherical shape.

As a result of the shape being spherical at least in areas, a spherical supporting of the articulated sections can be achieved, whereby the compensation of angle errors between the articulated sections is facilitated in an especially effective manner. The connection between the articulated sections can be produced without having to insert and then lock the male articulated part in the female articulated part at a special angle, which simplifies assembly. Expediently, the locking section on the articulated section side can form a region of an outer surface of the spherical, front-side thickening of the male articulated section. This makes a very compact arrangement possible without additional components.

Alternatively, it is also conceivable for the sealing groove to be arranged at a position on the inner side of the female articulated section that corresponds to the apex of the spherical shape of the male articulated section.

Through the arrangement of the sealing groove and, accordingly, the seal at the apex of the spherical shape, it can advantageously be achieved that the elastic tension acts circumferentially and uniformly on the two articulated sections. Through the positioning of the sealing groove at the apex of the spherical shape, the seal remains unchanged in relation to the articulated sections in the event of rotation. An O-ring can be used as a seal, for example.

According to one favorable design, the locking body can have a slot which is such that the diameter of the locking body is reversibly expandable. The locking body can be expanded and easily pushed over the spherical front side onto a region of the male articulated section with a smaller diameter. While the connection between the articulated sections is being established, the diameter of the locking body can remain unchanged. Only the locking elements are moved by sliding outward along the male articulated section into the locking contour of the corresponding articulated section, where they can lock in place. In particular, the locking body can be locked on the locking contour of the corresponding articulated section, e.g., of the female articulated section, and the, for example, male articulated section can still be movable within limits.

The articulated assembly is especially suited to producing semi-fixed connections of pipes, particularly charge air pipes in motor vehicles. The arrangement can work both in over-pressure and in under-pressure.

According to another aspect of the invention, a connecting pipeline with a pipe and at least one articulated assembly according to the invention connected firmly to the pipe. The articulated assembly can be welded to the pipeline, it being possible to employ different welding methods, or the fixed connection can be achieved in another suitable manner.

According to another aspect of the invention, an articulated section for an articulated assembly according to the invention is proposed in which at least one contour is provided on an inner side in a receiving region for locking elements of a locking body.

According to another aspect of the invention, an articulated section for an articulated assembly according to the invention is proposed in which a thickening is provided on a front-side end whose outer surface has a spherical region that is provided as a locking section in the assembled state for cooperating with a locking section of a locking body.

According to another aspect of the invention, a locking body for an articulated assembly according to the invention is proposed in which a locking contour is provided radially on the outside for fixing the locking body in the assembled state on a first articulated section and a locking section is provided radially on the inside for limiting a relative movement of a second articulated section in relation to the first articulated section.

BRIEF DESCRIPTION OF THE DRAWINGS

Additional advantages follow from the following description of the drawings. The drawings show exemplary embodiments of the invention. The drawings and the description contain numerous features in combination. A person skilled in the art will expediently also regard the features individually and group them together into other sensible combinations.

For the sake of example.

DESCRIPTION OF THE INVENTION

In the figures, same or similar components are designated by the same reference symbols. The figures merely show examples and are not to be understood as being limiting.

Figure 1:
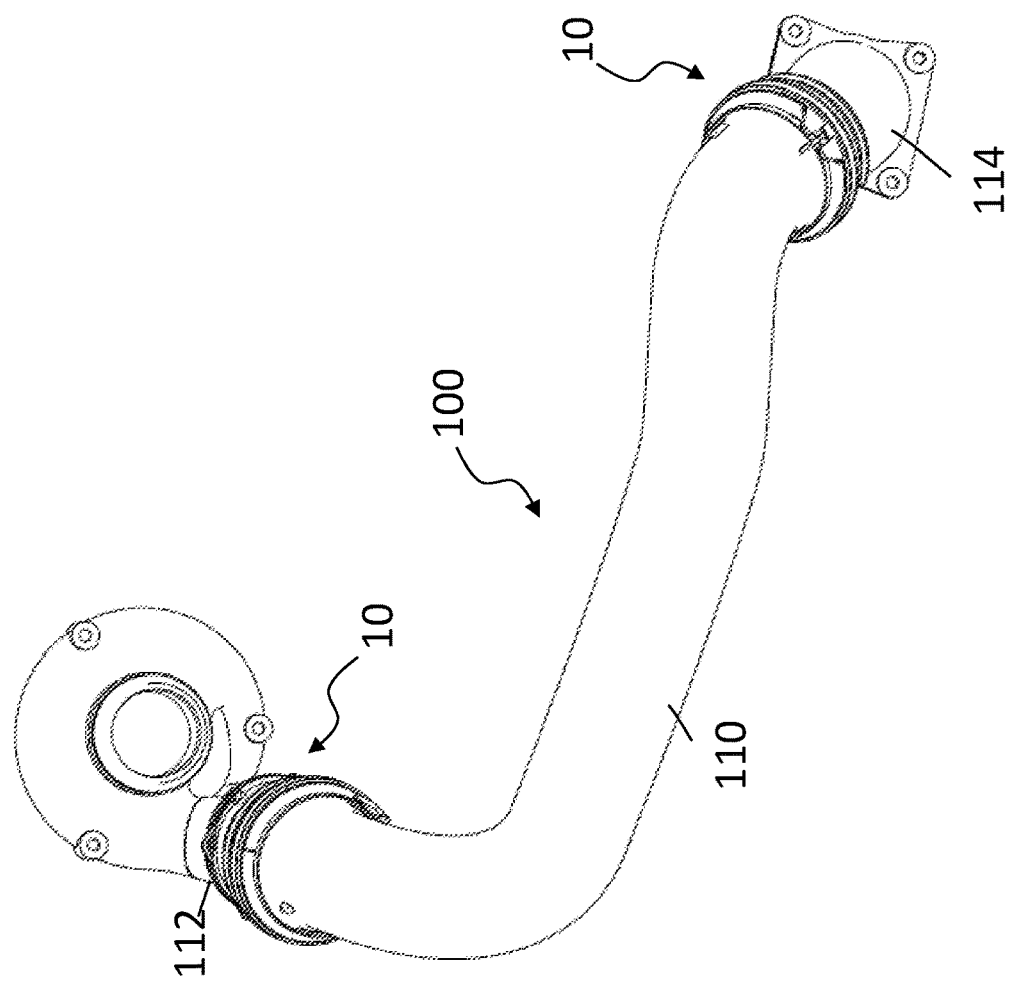
FIG. 1 shows an exemplary embodiment of a charge air pipe of a combustion engine with two articulated assemblies according to an embodiment of the invention.

To explain the invention, FIG. 1 shows an exemplary embodiment of a connecting pipeline 100 with two articulated assemblies 10 according to one embodiment of the invention. The connecting pipeline 100 in the form of a charge air pipe 110 of a combustion engine is connected at a first point of articulation 112 via the first articulated assembly 10 to a first pipe piece and connected at a remotely arranged point of articulation 114 via the second articulated assembly 10 to a second pipe piece. The connecting pipeline 100 is intended to be semi-fixed, i.e., it is not provided for dynamic movements during operation, but rather is substantially immobile and subjected only to slow movements for thermal equilibration.

The articulated assembly 10 forms a respective connection with a low level of mobility between two pipes or pipe sections. The articulated assembly 10 enables small movements between the pipe ends both from tilting movements and from axial movements to be compensated for. For instance, the articulated assembly 10 can compensate for tilting of up to 2.5° and a longitudinal shift between the two pipes of a few millimeters, for instance +/−3 mm. Likewise, an axial shift can easily be compensated for if two articulated assemblies 10 are provided on the connecting pipeline 100. The differences in movement are not equalized dynamically between the two end points, but rather the articulation element 10 merely acts as an equalization element for the assembly of the system and for tolerance compensation between two points of connection. In order to optimally exploit the advantages of the articulated assembly 10, it is recommended that the articulated assembly 10 be provided as a pair on both sides of the charge air pipe connection 110.

Figure 2:
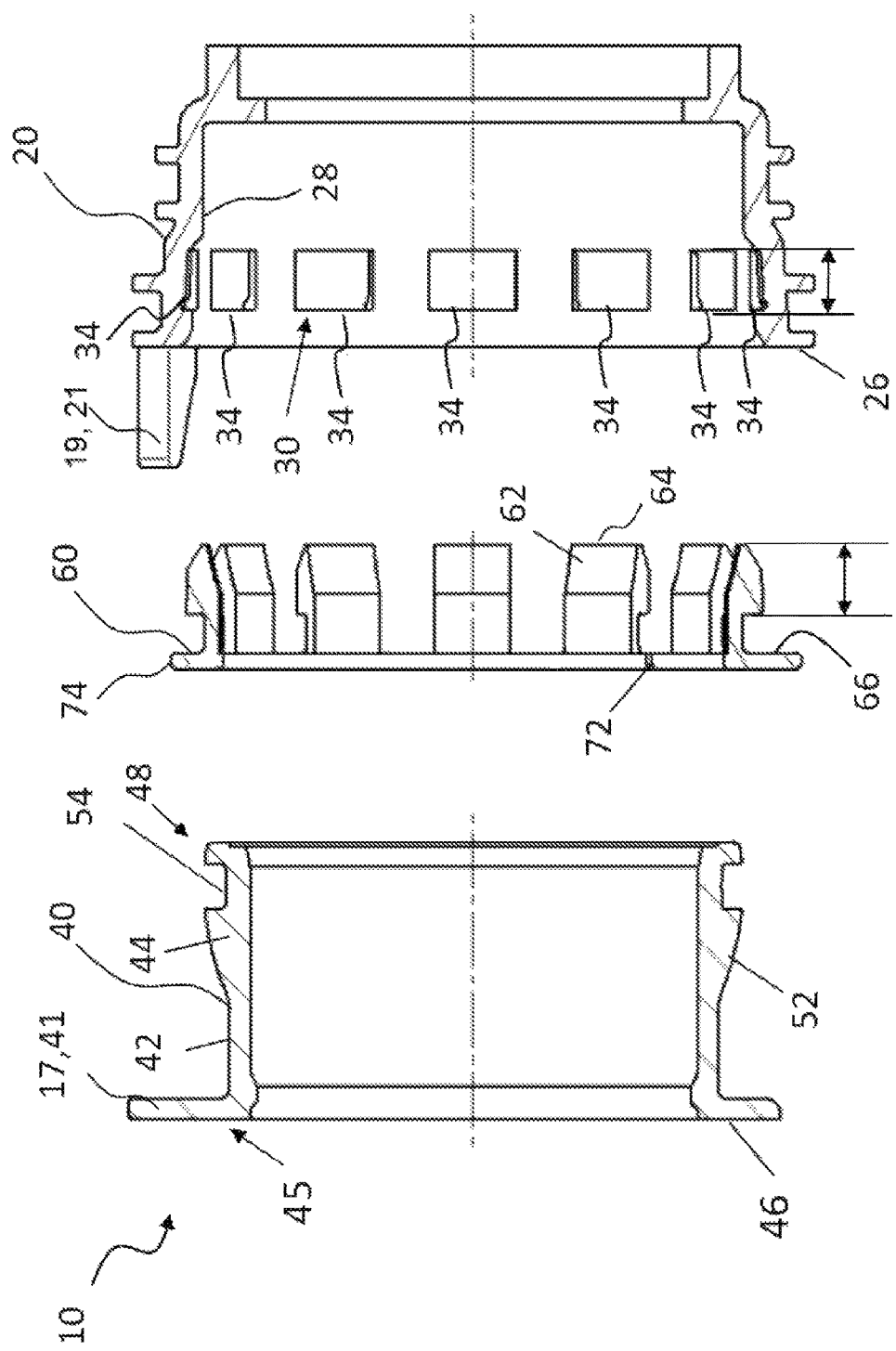
FIG. 2 shows a sectional representation of two articulated sections and a locking body of an articulated assembly before the assembly of the parts according to an embodiment of the invention.
Figure 3:
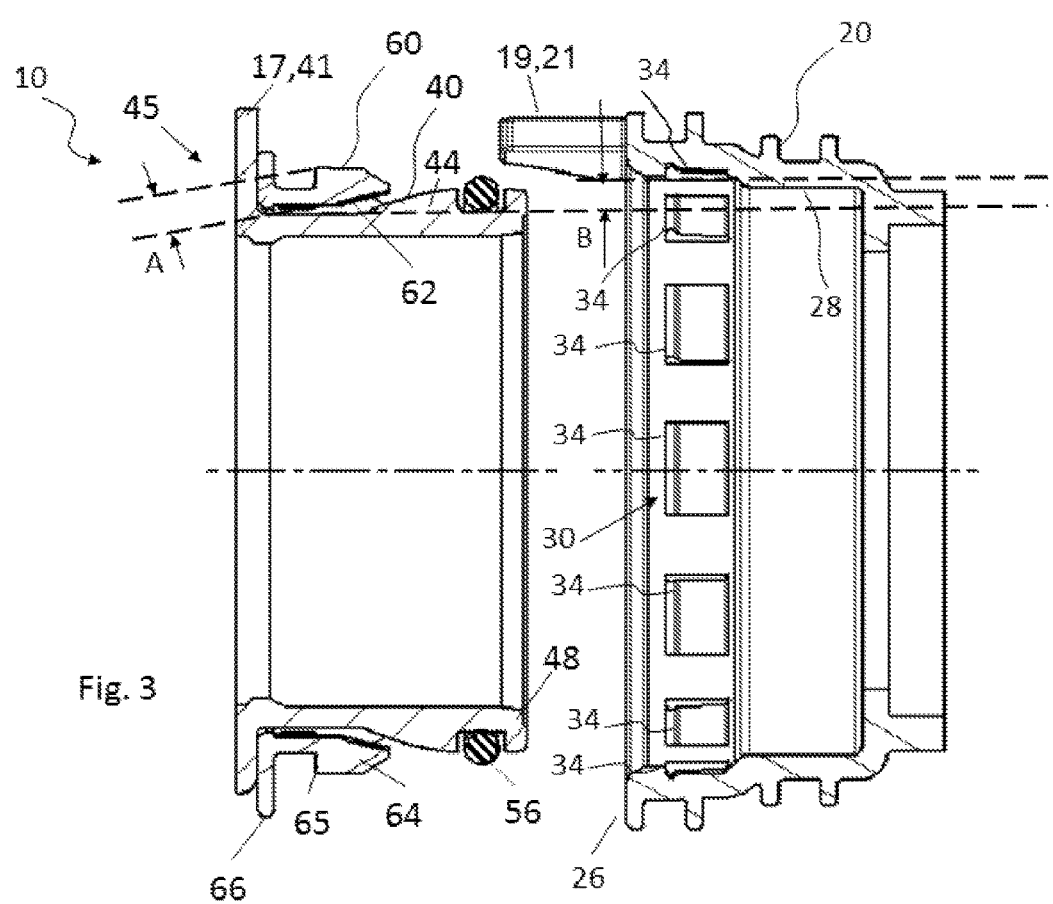
FIG. 3 shows a sectional representation of the articulated assembly from FIG. 2 with the locking body, which is pushed onto the male articulated section, before the fixing of the male articulated section on the female articulated section.
Figure 4:
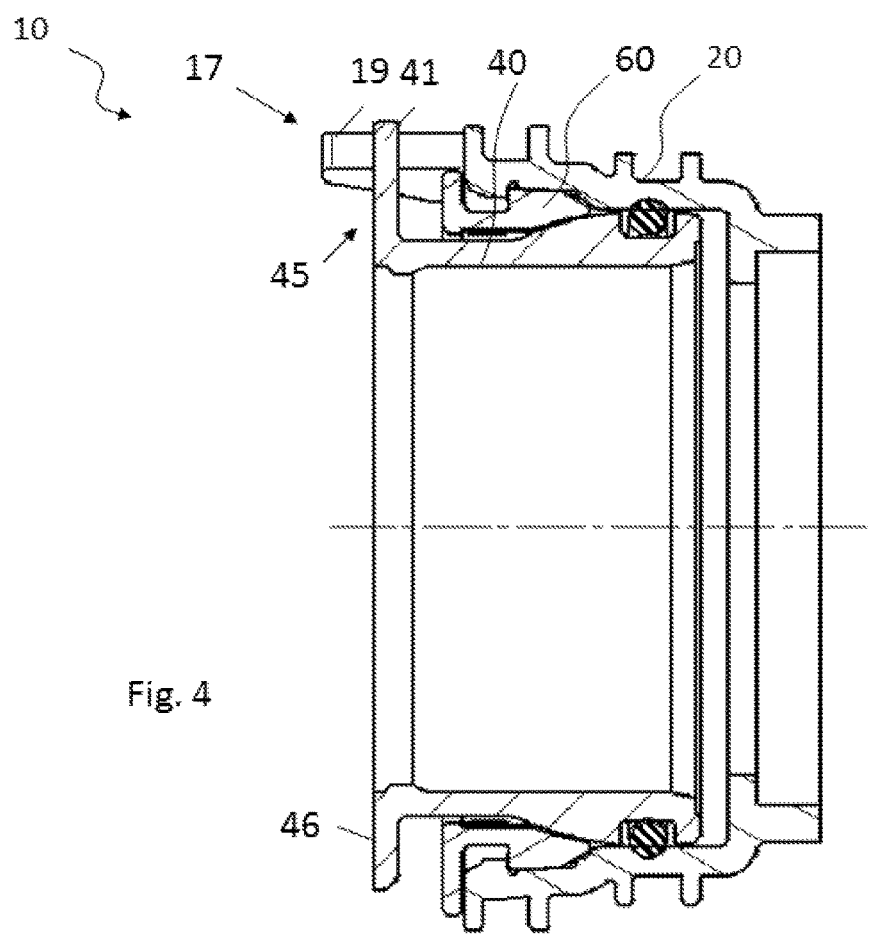
FIG. 4 shows a sectional representation of the articulated assembly from FIG. 2 after the closing of the articulated assembly, the locking body being locked on the female articulated section.

FIGS. 2 to 4 show an articulated assembly 10 in sectional representation before the articulated sections 20, 40 and locking body 60 are brought together (FIG. 2), in an intermediate step with pushed-on locking body 60 (FIG. 3), and in the closed state (FIG. 4).

Plastic or metal can be used as a material for articulated sections 20, 40 and locking body 60. Some examples of suitable metallic materials are steel or zinc die-casting. A combination of metallic material and plastic is also possible. For instance, the male articulated part 40 can be made of metal and the female articulated part 20 can be made of plastic.

The articulated assembly 10 comprises the female articulated section 20 and the male articulated section 40 as well as the locking body 60, which engages between the articulated sections 20, 40 and prevents the articulated sections 20, 40 from sliding apart.

The female articulated section 20 thus forms a socket, while the male articulated section 40 forms a joint ball of a ball joint.

In principle, the socket and joint ball can also be part of another component, such as a fitting, pipe element, or the like.

In the male articulated section 40, a spherical thickening 44 is provided in the region of the front-side end 48. In the thickened spherical region, a sealing groove 54 is arranged at the apex into which a seal 56, e.g., an O-ring, is placed in the assembled state. The seal 56 is used for the pressure-tight connection of joint ball and socket, i.e., of the female and male articulated section 20, 40.

The female articulated section 20 has on its inner side 28 a locking contour 30 that cooperates with locking elements 64 of the locking body 60, which are particularly embodied as locking catches. The locking contour 30 comprises a plurality of recesses 34 on the inner side 28 into which the locking elements 64 can engage with projections 65. Embodied across from the projections 65 on the inner side of the locking body 60 is a locking section 62 that cooperates with a locking section 52 of the other, male articulated section 40. The locking section 62 is embodied so as to correspond to the spherical shape of the locking section 52 of the articulated section 40.

The locking body 60 is embodied as a ring, particularly as a tapered ring, with a bearing ring 66 and axially extending locking elements 64, particularly locking catches. In the assembled state, the locking body 60 locks on its outer side with the female articulated section 20 and cooperates on its inner side with a locking section of the male articulated section.

In principle, an inverted design in which the locking body 60 locks on the male articulation part 40 and cooperates with a locking section of the female articulation part 20 would be conceivable.

The bearing ring 66 is used for placement onto a front side 26 of the female articulated section 20. The locking body 60 is used both for the fixing of the male articulated section 40 on the female articulated section 20 and for limiting a relative movement of the male articulated section 40 in relation to the female articulated section 20, thus reliably preventing detachment of the connection between the articulated sections 20, 40.

The articulated assembly 10 further comprises a guide means 17 with which a defined rotational positioning of the articulated sections 20, 40 is made possible. For this purpose, the female articulated section 20 has a fork with flanks 19, 21 extending in the axial direction between which a pin 41 of the male articulation part 40 extending in the radial direction engages. The pin 41 is arranged in the region of a recess 45 of an end ring 46 of the male articulated section 40. During assembly, the recess 45 enables the male articulated section 40 to slide past the fork of the female articulated section 20 when the pin 41 is guided between the flanks 19, 21. The recess 45 thus forms a lateral limit for the fork and thus a boundary for relative rotation between the articulated sections 20, 40. The flanks 19, 21 can have beveled outer edges and widen toward the female articulated section 20, which improves the guidance of the articulated section 40 toward the articulated section 20.

Figure 5:
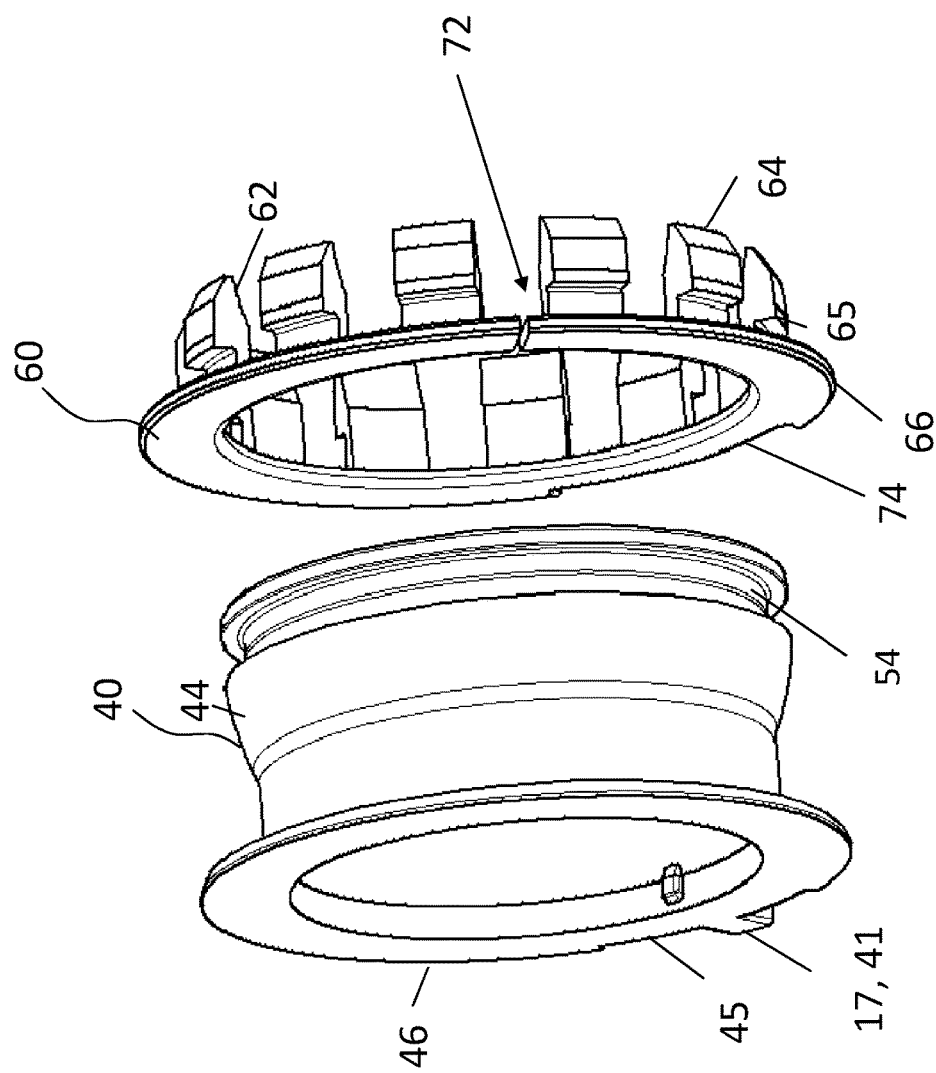
FIG. 5 shows an exploded view of the male articulated section and the locking body from FIG. 2.

On the periphery of the bearing ring 66, the locking body 60 has a recess 74 that is positioned in the region of the guide means 17. The bearing ring 66 has a diameter that is only slightly smaller than the circumference on the front side 26 of the female articulated section 20, so that the recess 74 permits the locking body 60 to slide by the flanks 19, 21 while simultaneously being in a rotational position that enables secure engagement of the locking elements 64 in the recesses 34 of the locking contour 30 without being visible from the outside. The details of the male articulated section 40 and of the locking body 60 can be seen in an exploded view in FIG. 5.

As can be seen from the succession of FIGS. 2 to 5, in order to assemble the articulated assembly 10, the locking body 60 is first pushed onto the male articulated section 40.

In order to make it possible to push the locking body 60 embodied as a tapered ring over the thickening 44 of the joint ball, the locking body 60 can be expanded. It is for this reason that the tapered ring is separated at a point by a slot 72 (FIG. 2), so that the tapered ring can open and be pushed over the thickening 44 on the joint ball (male articulated section 40).

The seal 56 is then mounted on the joint ball (male articulated section 40), after which the joint ball (male articulated section 40) is pressed with mounted seal 56 with the front side 48 first into the socket (female articulated section 20). The tapered ring (locking body 60) lies outside of the thickening 44 on the joint ball (male articulated section 40).

The locking body 60 (tapered ring) is also pressed into the socket (female articulated section 20). The locking catches (locking elements 64) of the tapered ring (locking body 60) still lie outside of the thickening 44, and their outer diameter can be compressed until they are able to dip under the locking contour 30 on the socket (female articulated section 20). The thickness of the locking elements 64 is dimensioned such that, when the articulated sections 20, 40 are brought together, it barely fits through the gap that forms beyond the thickening 44 between the input diameter of the female articulated section 20 and the region of the joint ball of the male articulated section 40.

The locking body 60, with its resilient locking elements 64, can pass below the inner contour of the locking contour 30 during assembly, it being possible to compress the locking body 60 with the locking section 62 on its inner surface to the outer surface of the male articulated section 40. In this compressed state, the outer edge of the projections 65 of the locking elements 64 has a smaller diameter than the inner diameter of the locking contour 30.

This can be achieved by embodying the gap height between the inner contour of the locking contour 30 of the female articulated section 20 and the cylindrical section 42 (see FIG. 2) of the outer contour of the male articulated section 40 behind the spherical thickening 44 (designated as B in FIG. 3) so as to be greater than the distance between the outer edge of the projection 65 of the locking body 60 and the inner contour of the locking section 62 of the locking body 60 (designated as A in FIG. 3). Only when distance A is less than or equal to the gap height B can the locking body 60 be pressed into the gap between the two articulated sections 20, 40.

The joint ball and the tapered ring are pressed in in the axial direction until the locking catches (locking elements 64) lock behind the recesses 34 of the locking contour 30 of the socket. Since the outer diameter of the locking elements 64 is greater than the inner diameter of the locking contour 30, the tapered ring (locking body 60) is securely fixed on the female articulated section 20 and can no longer be removed non-destructively. If the articulated assembly 10 is subjected to a tensile load, the tapered ring (locking body 60) acts as a form-fitting connection in relation to the spherical thickening 44 on the joint ball and prevents the articulated assembly 10 from opening. The locking section 62 on the inner side of the locking elements 64 of the locking body 60 and the locking section 52 of the joint ball (male articulated section 40) on the spherical thickening 44 thus form a positive fit on contact, since they are embodied so as to have complementary shapes, e.g., the locking section 52 on the thickening 44 is arched convexly outwardly (spherical) and the locking section 52 is arched concavely inward.

Figure 6:
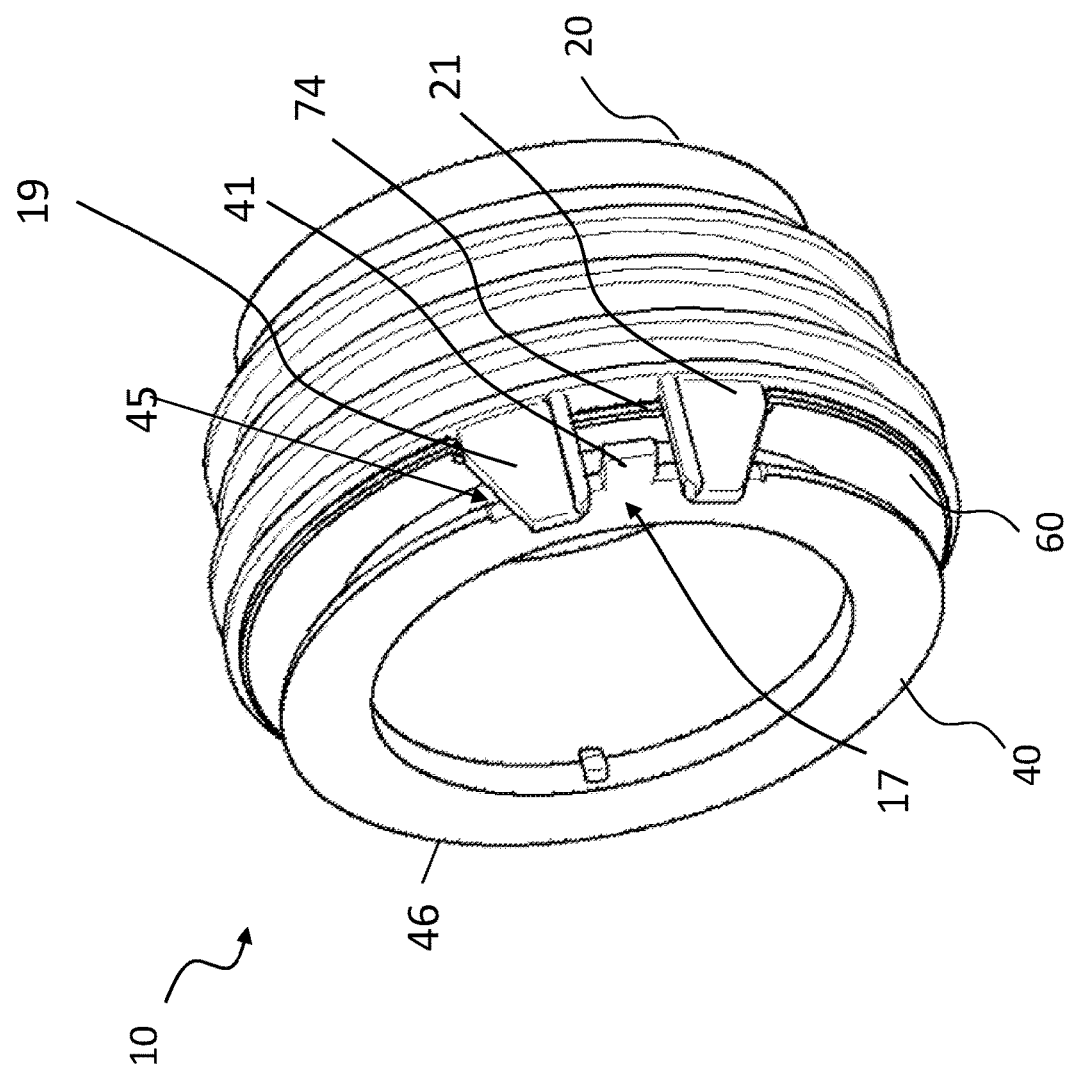
FIG. 6 shows an isometric representation of the closed articulated assembly with a guide means.

FIG. 6 shows an isometric representation of the articulated assembly 10 from FIG. 2 with closed coupling according to FIG. 4. The locking body 60 dips nearly completely, except for the bearing ring 66, into the female articulated section 20. Likewise, the male articulated section 40 dips to a large extent into the female articulated section 20, it being possible to discern based on the position of the radially outwardly projecting pin 41 of the guide means 17 on the male articulated section 40 whether the components are properly positioned in relation to one another.

What is claimed is:

1. An articulated pipe joint assembly compensating for lateral movement and tilting movements, comprising:
    a male articulated fluid pipe section having:
        an axially extending cylindrical body having:
            a first axial end;
            an opposite second axial end;
            an open interior extending from the first axial end to the second axial end, for conducting a fluid flow through the male articulated fluid pipe section; and
            a radially outwardly projecting pin formed on an exterior of the male articulated fluid pipe section; and
    a female articulated fluid pipe section having:
        an inner wall circumferentially surrounding an open interior of the female articulated section;
        a plurality of recesses formed in the inner wall;
        a guide means arranged on a front face of the female articulated section and projecting axially outwardly away from the female articulated section, the guide means having a gap into which the radially outwardly projecting pin engages;
    wherein the axially extending cylindrical body of the male articulated section is received into the open interior of the female articulated section;
    a locking body installable between the male articulated section and the female articulated section, the locking body having:
        a bearing ring, the bearing ring received over and surrounding the axially extending cylindrical body of the male articulated section;
        a plurality of locking elements formed on a rear axial side of the bearing ring and projecting axially outwardly away from the bearing ring, the plurality of locking elements aligned to engage into the plurality of recesses of the female articulated section when the locking body is installed on the female articulated section;
    wherein the locking body engages at least in areas with the male articulated fluid pipe section and with the plurality of recesses of the female articulated fluid pipe section, such that a relative movement between the articulated fluid pipe sections is limited;
    wherein the pin of the male articulated section engages with the guide means, such that the male and female articulated fluid pipe sections can be joined together in a limited rotational position relative to one another.

2. The articulated pipe joint assembly according to claim 1, wherein
    the recesses are embodied at the same axial height in the female articulated fluid pipe section.

3. The articulated pipe joint assembly according to claim 1, wherein
    the guide means joins together the male and female articulated fluid pipe sections in a defined rotational position in relation to one another.

4. The articulated pipe joint assembly according to claim 1, wherein the bearing ring of the locking body has on an outer circumference a recessed flattened region corresponding to the guide means, the guide means of the female articulated fluid pipe section positioned in the recessed flatten region to project axially over the exterior of the locking body and bearing ring.

5. The articulated pipe joint assembly according to claim 1, wherein
the guide means comprises a fork formed by two axially projecting flanks forming the gap therebetween, between which the radially projecting pin of the male articulated fluid pipe section can be guided.

6. The articulated pipe joint assembly according to claim 1, wherein
the plurality of locking elements of the locking body and the plurality of recesses of the female articulated fluid pipe section engage to form a positive fit on contact.

7. The articulated pipe joint assembly according to claim 1, wherein
the second axial end of the axially extending cylindrical body engaging in the female articulated fluid pipe section has a spherical shape.

8. The articulated pipe joint assembly according to claim 7, wherein
the axially extending cylindrical body has on an outer surface a sealing groove at an apex of the spherical shape.

9. The articulated pipe joint assembly according to claim 8, further comprising:
a seal ring arranged in the sealing groove and sealing between the male articulated section and the inner wall of the female articulated section.

10. The articulated pipe joint assembly according to claim 1, wherein
the locking body has a slot such that a diameter of the locking body is reversibly expandable.

11. The articulated pipe joint assembly according to claim 1, wherein
a thickening is provided on a radial outer surface of the axially extending cylindrical body, and an outer surface of the thickening has a spherical region which is provided in the assembled state as a locking section for cooperating with the plurality of locking elements of the locking body.

12. The articulated pipe joint assembly according to claim 1, wherein the locking body further comprises:
a locking contour provided radially on an outside of the locking body, the locking contour adapted to fix the locking body in the assembled state into the female articulated fluid pipe section; and
a locking section provided radially on an inside of the locking body for limiting a relative movement of the male articulated fluid pipe section in relation to the the female articulated fluid pipe section.

13. A charge air pipeline for an internal combustion engine, wherein
the charge air pipeline has a first end and an opposing second end,
the charge air pipeline further comprising:
an articulated pipe joint assembly according to claim 1, secured onto at least one of the first or second ends of the charge air pipeline.

14. A connecting pipeline with a pipe and at least one articulated pipe joint assembly according to claim 1 connected in a fixed manner to the pipe.

* * * * *